Dec. 14, 1965   J. J. ANTALEK   3,223,951
COIL FORM MOUNTING ARRANGEMENT FOR INDUCTANCE DEVICES
Original Filed June 22, 1959   2 Sheets-Sheet 1

INVENTOR.
JOHN J. ANTALEK
BY
Mason, Kolehmainen, Rathburn & Wyss
ATTORNEYS

Dec. 14, 1965  J. J. ANTALEK  3,223,951
COIL FORM MOUNTING ARRANGEMENT FOR INDUCTANCE DEVICES
Original Filed June 22, 1959  2 Sheets-Sheet 2

INVENTOR.
JOHN J. ANTALEK
BY
Mason, Kolehmainen, Rathburn & Wyss
ATTORNEYS

United States Patent Office 3,223,951
Patented Dec. 14, 1965

3,223,951
COIL FORM MOUNTING ARRANGEMENT FOR INDUCTANCE DEVICES
John J. Antalek, Glenview, Ill., assignor to TRW, Inc., a corporation of Ohio
Original application June 22, 1959, Ser. No. 821,802, now Patent No. 3,130,350, dated Apr. 21, 1964. Divided and this application Dec. 6, 1963, Ser. No. 328,593
1 Claim. (Cl. 336—92)

This application is a division of my copending application Serial No. 821,802, filed June 22, 1959, now Patent No. 3,130,350, granted April 21, 1964, and assigned to the same assignee as the present invention.

The present invention relates to coupling devices such as transformers, and, more particularly, to tuned coupling devices and transformers of the type used in radio and television circuits. For example, the invention may be employed in a transformer arrangement wherein the windings of the transformer are wound on a tubular coil form and one or more tuning capacitors are connected to the windings of the transformer, the entire assembly being positioned within a so-called shield can which is mounted to the chassis of the receiver or other electronic circuit.

While many coupling device arrangements have been proposed in the past wherein the tuning capacitors are mounted within the shield can and are connected to the windings of the transformer, these arrangements have in general not been readily adaptable to mass production techniques. On the other hand, those constructions which have been designed with mass production methods in mind have not provided a suitably reliable electrical connection between the tuning capacitors and the transformer windings, such arrangements relying on pressure between the terminals of the transformer and the plates of the capacitors for establishing the requisite electrical connection. In one such prior art arrangement employing pressure to maintain electrical contact, the capacitors are in the form of plated mica strips which are positioned in a sandwich type of construction in the base of the transformer, connection to the terminals of the transformer being solely by the pressure exerted on the sandwich by means of a spring washer and stud arrangement extending through the center of the transformer base.

It is, therefore, an object of the present invention to provide a new and improved base construction which facilitates fabrication of transformer assemblies on a mass production basis.

A further object of the present invention is to provide a new and improved base member construction for a transformer assembly whereby either large or small diameter coil forms may be employed with the same base member to facilitate assembly of the transformers on a mass production basis.

Briefly, in accordance with the present invention, the base member of the coupling device or transformer is provided with a universal coil form mounting arrangement adapted to receive large and small diameter coil forms. This coil form mounting arrangement is provided with a base member of insulating material having a tubular coil form mounting sleeve formed integrally therewith and extending upwardly therefrom. The sleeve is provided with vertically extending coil form engaging ribs in the surface thereof so that a tubular coil form of relatively large diameter may be inserted over said mounting sleeve and securely held against rotation with respect to the base member. The sleeve is also provided with an inner bore adjacent the base of the sleeve and means defining a shoulder adjacent the bottom end of said bore, said bore having vertically extending coil form engaging ribs formed therein so that a tubular coil form of relatively small diameter may be inserted into the sleeve and seated on the shoulder adjacent the bottom end of the bore.

The invention, both as to its organization and operation, together with further objects and advantages thereof, will best be understood by reference to the following detailed description taken in connection with the accompanying drawings, in which.

Figure 1:
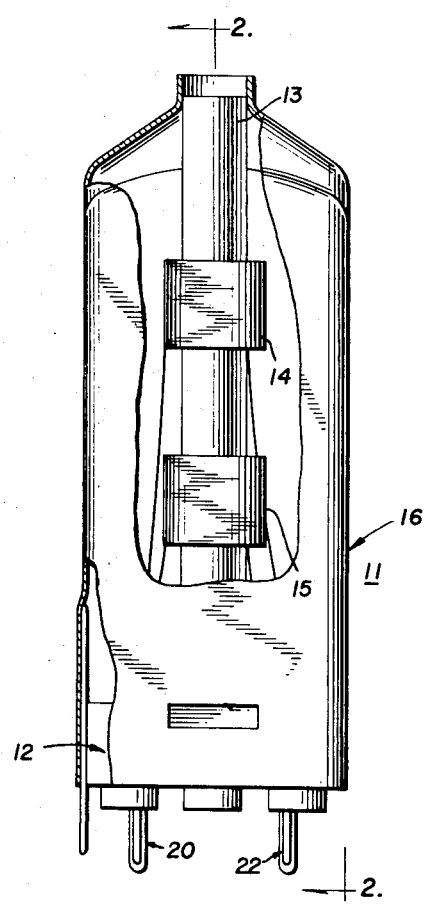
FIG. 1 is a front elevation view of a coupling device embodying the features of the present invention, portions of the shield can of this assembly being broken away to show certain features of construction.

Referring now to the drawings, there is shown a coupling device arrangement indicated generally at 11 and comprises a base member indicated generally at 12, a coil form 13 which is positioned on the base member 12 and carries a pair of multilayer coils 14 and 15 thereon, and a shield can indicated generally at 16. The coils 14 and 15 may conveniently be wound of insulated copper wire on the coil form 13 and the ends of these coils are secured to terminal members indicated generally at 20, 21, 22 and 23, these terminal members being secured in the base member 12 by means to be discussed in more detail hereinafter. It will be understood that although the transformer shown in FIG. 1 utilizes a pair of coils 14 and 15, a greater or lesser number of coils may be provided on the form 13 if desired.

Figure 2:
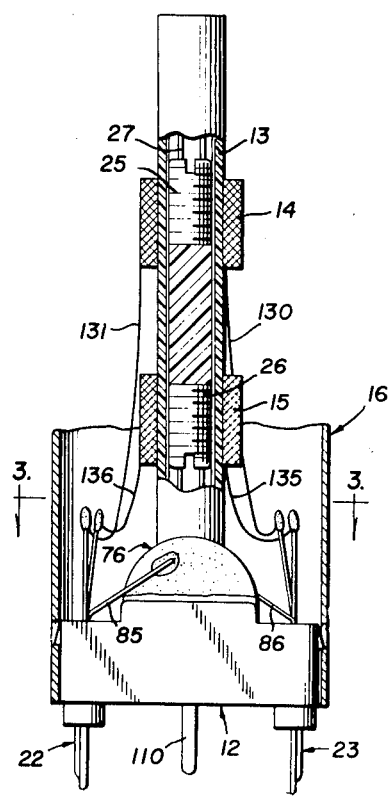
FIG. 2 is a right side elevation view of the coupling device with the shield can broken away and a portion of the coil form assembly being shown in section through the center line thereof.

In order to adjust the magnetic coupling between the coils 14 and 15 as well as to change the inductance of each of these coils, the ferromagnetic core members 25 and 26 (FIG. 2) may be adjustably positioned in the coil form 13. The coil form 13 may be provided with a plurality of thin ribs 27 which extend longitudinally along the inner surface of the coil form 13 whereby the cores 25 and 26 may be adjustably positioned with respect to the coils 14 and 15, this construction of the coil form 13 being described and claimed in U.S. Letters Patent No. 2,838,738, granted to John J. Antalek and Robert W. Saville on June 10, 1958. While such construction of the coil form 13 cooperates with the specific form of base construction of present invention, it will be understood that any other suitable coil form and tuning slug arrangement may be employed whereby a variable inductance device is provide insofar as the other features of the present invention are concerned. Furthermore, it will be understood that the coils 14 and 15 need not be variable insofar as the present invention is concerned although it is customary to provide variation of the transformer windings to facilitate alignment of the transformer once it is assembled in its electronic circuit.

The terminal 21 is mounted in a vertically extending slot 35 provided in the base member 12, similar slots 36, 37 and 38 being provided respectively for the terminals 20, 22 and 23.

The inturned arm portions of opposed pairs of terminal members are employed to support a tuning capacitor or other disc type unit on edge on the base member 12 by engagement with opposite sides of the tuning capacitor. More particularly, considering the pair of terminals 20 and 21, the inturned arm portion 50 of the terminal 20 and the inturned arm portion 31 of the terminal 21 are adapted to engage the opposite sides of a disc type tuning capacitor indicated generally at 51, the capacitor 51 being supported on edge on the base member 12.

Considering now the manner in which the capacitor 51 is supported on the base member 12, the base member 12 is provided with a top opening recess, the edge of the capacitor 51 resting on the bottom surface 55 of this top opening recess. In order to facilitate positioning of the capacitor 51 on edge on the base member 12 with the arm portions 50 and 31 in engagement with opposite sides thereof, the base member 12 is provided with a pair of opposed positioning posts or studs 60 and 61 adjacent the terminals 20 and 21 which extend upwardly from the bottom surface 55 of the recess in the base member 12. In addition, a further positioning post or stud 64 extends upwardly from the bottom surface 55 of the top opening recess in the member 12, the stud 64 being spaced from the positioning stud 61, and an inwardly projecting vertically extending rib or lug portion 65 (FIG. 3) is provided on the outer wall 66 of the base member 12 adjacent to but spaced from the positioning stud 60.

It will thus be seen that the positioning posts 60, 61 and 64 and the projecting lug 65 define an elongated narrow slot which is adapted to receive the tuning capacitor 51 on edge and loosely supports the same on the base member 12. In this connection it will be noted that the arm portions 50 and 31 are provided respectively with the oppositely directed right angle end portions 70 and 71 which actually contact the opposed bare electrodes on opposite sides of the capacitor 51 so that contact to the plates of the capacitor 51 is established through the end portions 70 and 71 at a localized area on the plates.

Figure 3:
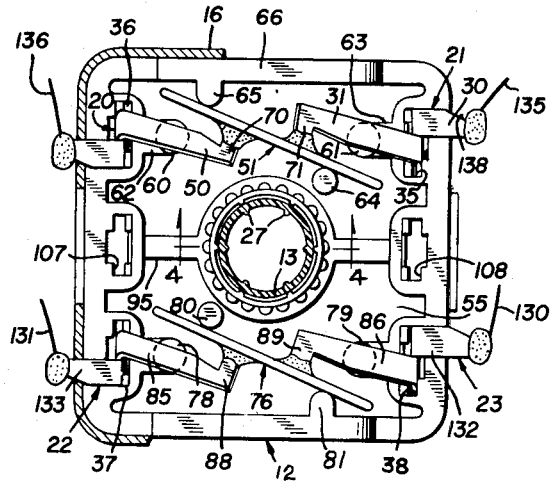
FIG. 3 is a sectional view taken along the lines 3—3 of FIG. 2.
Figure 4:
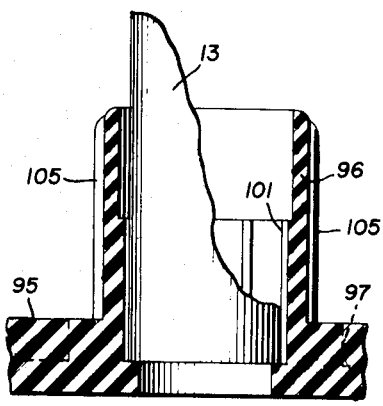
FIG. 4 is a sectional view on an enlarged scale taken along the lines 4—4 of FIG. 3 and showing a relatively small diameter coil form positioned on the base member.

The base member 12 is also arranged to support a second tuning capacitor, indicated generally at 76, between the spaced apart terminals 22 and 23. More particularly, the positioning posts 78 and 79 are provided adjacent the terminals 22 and 23, respectively, these posts being similar to the positioning posts 60 and 61 described above, a positioning post 80 is positioned in spaced relation to the post 78 and a vertically extending lug 81 on the base 12 is provided in spaced relation to the post 79. The inturned arm portions 85 and 86 of the terminals 22 and 23, respectively, are provided with oppositely directed end portions 88 and 89 which are adapted to engage the opposite sides of the capacitor 76 at laterally spaced points thereon so that a twisting action is exerted on this capacitor and it is urged against the sides of the positioning post 80 and the lug 81 so that it is held on edge in the base 12, as shown in FIG. 3.

The dip soldering operation whereby the terminal members of the transformer are conductively bonded to the electrodes of the tuning capacitors is performed before the coil form 13 is assembled on the base member 12, and before the leads from the coils positioned on the coil form are connected to the vertically extending portions of the terminal members. In this connection it will be understood that the vertically extending portions of the terminal members 20 to 23, inclusive, such as the vertical bifurcation 30 of the terminal 21, are also immersed in the molten solder during the above described dip-soldering operation. However, this operation only has the effect of tinning the ends of the vertically extending terminal portions, such as the portion 30, and thus facilitates the connection of the coil leads to these terminals at a later time. However, if desired, the vertically extending terminal portions, such as the portions 30, may be bent outwardly so that they do not contact the solder during the dip-soldering operation if, for any reason, it is not desired to tin these terminal portions.

Figure 6:
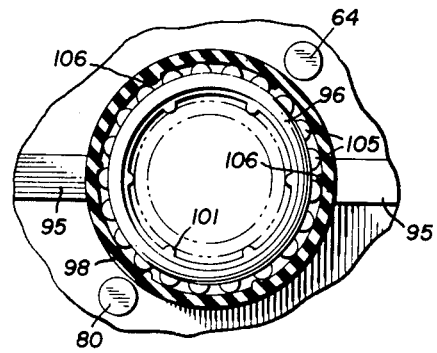
FIG. 6 is a sectional view taken along the lines 6—6 of FIG. 5.
Figure 5:
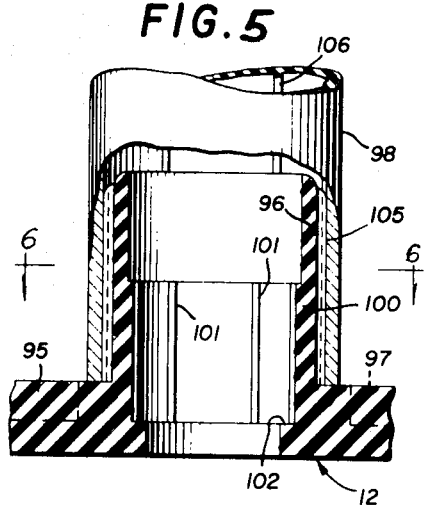
FIG. 5 is a sectional view similar to FIG. 4 but showing the manner in which a relatively large diameter coil form is supported on the base member.

Considering now the manner in which the coil form 13 is assembled on the base member 12, a transverse reinforcing rib 95 is provided across the bottom of the recess in the base member 12 in the center of which rib there is provided an annular mounting sleeve 96 which extends upwardly from a circular base portion 97. The mounting sleeve 96 is arranged to support either the relatively small diameter coil form 13 or a relatively large diameter coil form 98 (FIGS. 5 and 6). More particularly, in order to receive the relatively small diameter coil form 13 within the mounting sleeve 96, this sleeve is provided with a stepped portion 100 of somewhat smaller internal diameter which extends only partially up to the length of the sleeve 96, the stepped portion 100 being provided with a series of vertically extending inwardly projecting ribs 101 which function to grip the outer surface of the coil form 13 when it is inserted into the step portion 100 of the mounting sleeve 96. An inwardly extending shoulder 102 is provided at the bottom of the mounting sleeve 96 so as to seat the bottom of the coil form 13. It will be noted that the coil form 13 is secured within the mounting sleeve 96 by engagement with only the stepped portion 100 thereof so that the outward force exerted on the mounting sleeve 96 when the coil form 13 is inserted therein is applied only to the base portion of the sleeve and hence cracking or splitting of the sleeve is avoided.

The mounting sleeve 96 is also provided with a series of closely spaced vertically extending ribs 105 on the outer surface thereof. The ribs 105 are provided for the purpose of interlocking with the internal longitudinally extending ribs 106 of a relatively large diameter coil form 98 when this coil form is inserted over the outside of the mounting sleeve 96, the coil form 98 being forced over the sleeve 96 until it seats on the circular base portion 97. Due to the interlocking of the ribs 105 and 106 the coil form 98 is not only firmly seated on the mounting sleeve 96 but is also prevented from rotating with respect to the base member 12. In this connection it will be understood that the ribs 106 may serve the additional function of adjustably positioning the tuning slugs within the coil form 98, as described in the above identified Patent No. 2,838,738. Also, it will be noted that the positioning posts 64 and 80 are spaced from the outside ribs 105 on the mounting sleeve 96 by an amount sufficient to permit the insertion of the large diameter coil form 98 over the sleeve 96. It will also be noted that the positioning posts 64 and 80 serve the additional purpose of providing a positioning means for the tuning capacitors while permitting the coil form 98 to be inserted over the mounting sleeve 96 after the tuning capacitors have been soldered in place in the manner described above.

The coils 14 and 15 may be wound on the coil form 13 either before or after this coil form is positioned on the base member 12. However, it will be understood that if the coils 14 and 15 are wound on the coil form 13 after this coil form is secured to the base member 12, the upstanding terminal portions, such as the portion 30 of the terminal members of the transformer are preferably bent outwardly so as to provide clearance for the coil winding mechanism in the event that the coil is wound relatively close to the base member 12. It has been found that the procedure of winding the coils 14 and 15 after the coil form 13 has been secured to the base member 12 results in a somewhat simpler manufacturing technique in that the ends of the respective coils can first be secured to the corresponding upstanding terminal portions so that the coil winding operator can trace the start and finish coil leads more easily. In this connection, it will be understood that the start and finish leads 130 and 131 of the coil 14 are connected to a pair of terminal members which are positioned on opposite sides of the recess in the base member so that the tuning capacitor connected between the inturned arm portions of these terminal members is connected across the coil. Thus, the leads 130 and 131 are connected to the vertically extending portions 132 and 133 of the terminals 23 and 22, respectively, so that the tuning capacitor 76 is connected across the coil 14. In a similar manner the leads 135 and 136 may be connected to the upstanding terminal portions of the terminals 21 and 20, respectively, so as to connect the capacitor 21 across the winding 15. It will be noted that the upstanding terminal portions, such as the portion 30 of the terminal 21, are provided with a notch 138 in the upper end thereof to facilitate connection of the coil leads to these terminals, it being necessary only to hook the coil leads over the notches 138 and wrap the lead one or two turns around the terminal. After the coil leads have been secured to the upstanding terminal portions in the manner described above, they may be conveniently dip-soldered to these terminals by bending the terminals outwardly so that they extend beyond the edge of the base member 12. When so bent the terminals with coil leads attached thereto may be lowered into a pot of molten solder so that the coil leads on one side of the base member may both be soldered simultaneously to their respective terminals, it being understood that the transformer assembly is not lowered into the solder sufficiently to permit the solder to contact either the base member 12 or the coils on the coil form 13. The transformer assembly may then be turned over and the terminals of the opposite side of the base member soldered by a similar dip-soldering operation, after which all four of the terminal members are bent back to their initial vertical position. The transformer assembly is then ready for the shield can 16 to be assembled thereon.

In this connection it will be noted that the base member 12 is provided with a pair of terminal receiving slots 107 and 108 within which may be positioned terminals similar to the terminals 20 to 23, inclusive, but which are, however, not provided with an inturned arm portion such as the arm portion 31 of the terminal 21. These intermediate terminals may be employed to establish connection to other desired connection points on the coils positioned on the coil form 13, such, for example, as a center tap for either of the coils 14 or 15. However, since no tuning capacitor is to be connected across these intermediate terminals the inturned arm portions thereof are not required.

While particular embodiments of the invention have been shown, it will be understood, of course, that the invention is not limited thereto, since many modifications may be made, and it is therefore contemplated by the appended claim to cover any such modifications as fall within the true spirit and scope of the invention.

What is claimed as new and is desired to be secured by Letters Patent of the United States is:

In an inductance device, a base member of insulating material, said base member having a universal coil form mounting arrangement for large and small diameter coil forms, said coil form mounting arrangement comprising a tubular sleeve formed integrally with said base member and extending upwardly therefrom, said sleeve having vertically extending coil form engaging ribs formed in the outer surface thereof so that a tubular coil form of relatively large diameter may be inserted over said sleeve and securely held against rotation with respect to said base member, said sleeve also having an inner bore defining a portion of reduced inner diameter adjacent the base of said sleeve, means defining a shoulder adjacent the bottom end of said bore, said reduced diameter portion having vertically extending coil form engaging ribs formed therein so that a tubular coil form of relatively small diameter may be inserted into said sleeve without damage thereto and seated on said shoulder.

References Cited by the Examiner
UNITED STATES PATENTS

| | | | |
|---|---|---|---|
| 2,464,029 | 3/1949 | Ehrman | 29—155.58 |
| 2,503,879 | 4/1950 | MacDonald | 336—87 |
| 2,555,511 | 6/1951 | Sands | 336—87 X |
| 2,586,320 | 2/1952 | Ford | 29—155.58 |
| 2,648,031 | 8/1953 | Lang et al. | 336—87 X |
| 2,748,357 | 5/1956 | Garcia | 336—87 X |
| 2,988,715 | 6/1961 | Gizynski et al. | 336—92 X |
| 3,011,138 | 11/1961 | Antalek | 336—87 X |

ROBERT K. SCHAEFER, *Primary Examiner.*

JOHN F. BURNS, *Examiner.*

W. M. ASBURY, *Assistant Examiner.*